US012175990B2

(12) United States Patent
Villemoes et al.

(10) Patent No.: US 12,175,990 B2
(45) Date of Patent: *Dec. 24, 2024

(54) PARAMETRIC RECONSTRUCTION OF AUDIO SIGNALS

(71) Applicant: DOLBY INTERNATIONAL AB, Dublin (IE)

(72) Inventors: Lars Villemoes, Järfälla (SE); Heidi-Maria Lehtonen, Upplands Väsby (SE); Heiko Purnhagen, Sundbyberg (SE); Toni Hirvonen, Helsinki (FI)

(73) Assignee: DOLBY INTERNATIONAL AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,028

(22) Filed: Sep. 25, 2023

(65) Prior Publication Data

US 2024/0087584 A1 Mar. 14, 2024

Related U.S. Application Data

(60) Continuation of application No. 17/946,060, filed on Sep. 16, 2022, now Pat. No. 11,769,516, which is a (Continued)

(51) Int. Cl.
*G10L 19/16* (2013.01)
*G10L 19/008* (2013.01)
(Continued)

(52) U.S. Cl.
CPC .......... *G10L 19/167* (2013.01); *G10L 19/008* (2013.01); *G10L 19/265* (2013.01); *H04S 5/005* (2013.01); *H04S 2420/03* (2013.01)

(58) Field of Classification Search
CPC ... G10L 19/008; G10L 19/167; G10L 19/265; H04S 5/005; H04S 2420/03
See application file for complete search history.

(56) References Cited

U.S. PATENT DOCUMENTS 6,111,958 A 8/2000 Maher
7,876,904 B2 1/2011 Ojala
(Continued)

FOREIGN PATENT DOCUMENTS

CA 3026283 A1 9/2005
CN 1969317 A 5/2007
(Continued)

OTHER PUBLICATIONS

Capobianco, J., et al. "Dynamic strategy for window splitting, parameters estimation and interpolation in spatial parametric audio coders," IEEE International Conference on Acoustics, Speech and Signal Processing, Kyoto, Japan, Mar. 25-30, 2012, pp. 397-400.
(Continued)

*Primary Examiner* — Eric Yen

(57) ABSTRACT

An encoding system encodes an N-channel audio signal (X), wherein N≥3, as a single-channel downmix signal (Y) together with dry and wet upmix parameters ($\tilde{C}$, $\tilde{P}$). In a decoding system, a decorrelating section outputs, based on the downmix signal, an (N−1)-channel decorrelated signal (Z); a dry upmix section maps the downmix signal linearly in accordance with dry upmix coefficients (C) determined based on the dry upmix parameters; a wet upmix section populates an intermediate matrix based on the wet upmix parameters and knowing that the intermediate matrix belongs to a predefined matrix class, obtains wet upmix coefficients (P) by multiplying the intermediate matrix by a predefined matrix, and maps the decorrelated signal linearly in accordance with the wet upmix coefficients; and a com-
(Continued)

bining section combines outputs from the upmix sections to obtain a reconstructed signal ($\hat{X}$) corresponding to the signal to be reconstructed.

13 Claims, 7 Drawing Sheets

Related U.S. Application Data continuation of application No. 16/842,212, filed on Apr. 7, 2020, now Pat. No. 11,450,330, which is a continuation of application No. 16/363,099, filed on Mar. 25, 2019, now Pat. No. 10,614,825, which is a continuation of application No. 15/985,635, filed on May 21, 2018, now Pat. No. 10,242,685, which is a division of application No. 15/031,130, filed as application No. PCT/EP2014/072570 on Oct. 21, 2014, now Pat. No. 9,978,385.

(60) Provisional application No. 62/037,693, filed on Aug. 15, 2014, provisional application No. 61/974,544, filed on Apr. 3, 2014, provisional application No. 61/893,770, filed on Oct. 21, 2013.

(51) Int. Cl.
*G10L 19/26* (2013.01)
*H04S 5/00* (2006.01)

(56) References Cited

U.S. PATENT DOCUMENTS 8,019,350 B2 9/2011 Purnhagen
8,041,041 B1 10/2011 Luo
8,116,459 B2 2/2012 Disch
8,258,849 B2 9/2012 Lee
8,346,379 B2 1/2013 Lee
8,346,380 B2 1/2013 Lee et al.
8,537,913 B2 9/2013 Kim
8,553,895 B2 10/2013 Plogsties
9,734,832 B2 8/2017 Neusinger
2004/0125960 A1 7/2004 Fosgate
2006/0136229 A1 6/2006 Kjoerling
2006/0165184 A1 7/2006 Purnhagen et al.
2006/0165247 A1 7/2006 Mansfield
2006/0239473 A1 10/2006 Kjorling et al.
2007/0002971 A1 1/2007 Purnhagen et al.
2008/0140426 A1* 6/2008 Kim ...................... G10L 19/087 704/E19.042
2008/0279388 A1 11/2008 Oh
2008/0294444 A1 11/2008 Oh
2009/0003611 A1 1/2009 Oh
2009/0125313 A1 5/2009 Hellmuth
2009/0234657 A1 9/2009 Takagi et al.
2009/0326959 A1 12/2009 Herre
2010/0040135 A1* 2/2010 Yoon .................. H04N 21/8113 375/240.01
2010/0094631 A1 4/2010 Engdegard et al.
2010/0296672 A1 11/2010 Vickers
2011/0096932 A1 4/2011 Schuijers
2011/0173005 A1 7/2011 Hilpert
2011/0200196 A1* 8/2011 Disch ........................ H04S 7/30 381/22
2011/0255714 A1* 10/2011 Neusinger ............. G10L 19/008 381/119
2011/0264456 A1 10/2011 Koppens et al.
2012/0020499 A1 1/2012 Neusinger
2012/0039477 A1 2/2012 Schijers
2012/0177204 A1 7/2012 Hellmuth
2012/0232910 A1 9/2012 Dressler
2012/0243690 A1 9/2012 Engdegard
2012/0263308 A1 10/2012 Herre
2013/0329922 A1 12/2013 Lemieux
2014/0016784 A1 1/2014 Sen
2014/0025386 A1 1/2014 Xiang
2015/0177204 A1 6/2015 Bessen et al.
2015/0179180 A1* 6/2015 Oh ......................... H04S 5/005 381/22

FOREIGN PATENT DOCUMENTS

CN 1998046 A 7/2007
CN 101529501 A 9/2009
CN 101930742 A 12/2010
CN 102163429 8/2011
CN 101410890 B 1/2012
CN 101484936 B 2/2012
CN 102446507 5/2012
CN 103325383 9/2013
CN 103493128 1/2014
EP 1738353 A1 1/2007
EP 2214162 8/2010
JP 2007-178684 7/2007
JP 2010-525403 7/2010
JP 2012-505575 3/2012
JP 2012-525051 10/2012
KR 10-2011-0111432 10/2011
KR 102381216 A 4/2022
RU 2011117698 11/2012
WO 2006048204 A1 5/2006
WO 2006103584 A1 10/2006
WO 2007/007263 1/2007
WO 2007/114624 10/2007
WO 2007/146424 12/2007
WO 2008/131903 11/2008
WO 2010/040456 4/2010

OTHER PUBLICATIONS

Cheng, Bin et al. "A General Compression Approach to Multi-Channel Three-Dimensional Audio," IEEE Transactions on Audio, Speech, and Language Processing, v. 21, n. 8, Aug. 2013, pp. 1676-1688.
Chun, Chan Jun et al. "Real-time conversion of stereo audio to 5.1 channel audio for providing realistic sounds," International Journal of Signal Processing, Image Processing and Pattern Recognition, v 2, n 4, 2008, pp. 85-94.
Chun, Chan Jun et al. "Upmixing stereo audio into 5.1 channel audio for improving audio realism," Communications in Computer and Information Science, v 61,Signal Processing, Image Processing and Pattern Recognition: International Conference, SIP 2009, Jeju Island, Korea 2009, pp. 228-235.
Claypool, Brian et al. "Auro 11.1 versus object-based sound in 3D," retreived from http://testsc.barco.com/~/media/Downloads/White%20papers/2012/WhitePaperAuro%20111%20versus%20objectbased%20sound%20in%203Dpdf.pdf on Mar. 14, 2013, 18 pages.
ETSI TS 103 190-2 V.1.1.1 Digital Audio Compression (AC-4) Standard Part 2: Immersive and Personalized Audio, Sep. 2015.
Ghaderi, M. et al "Wideband Speech Coding Using ADPCM and a New Spectral replication Method based on Parametric Stereo Coding" 2011, 19th Iranian Conference on Electrical Engineering, pp. 1-4, year 2011.
ISO/IEC WD0 23008-3. Information Technology—High Efficiency Coding and Media delivery in Heterogenous Environments—Part 3:3D Audio, Oct. 2013.
Koo, Kyungryeol, et al. "Variable Subband Analysis for High Quality Spatial Audio Object Coding," 10th International Conference on Advanced Communication Technology (ICACT), Feb. 17-20, 2008, pp. 1205-1208.
Marston, David "Assessment of stereo to surround upmixers for broadcasting," 130th Audio Engineering Society Convention, London, UK, May 13-16, 2011, 9 pages.
Vinton, Mark S., et al. "Signal models and upmixing techniques for generating multichannel audio," AES 40th International Conference, Tokyo, Japan, Oct. 8-10, 2010, 12 pages.

* cited by examiner

PARAMETRIC RECONSTRUCTION OF AUDIO SIGNALS

CROSS-REFERENCE TO RELATED APPLICATIONS

This application is a continuation of U.S. patent application Ser. No. 17/946,060 filed on Sep. 16, 2022, which is a continuation of U.S. patent application Ser. No. 16/842,212 filed on Apr. 7, 2020 (now U.S. Pat. No. 11,450,330 issued Sep. 20, 2022), which is a continuation of U.S. patent application Ser. No. 16/363,099 filed on Mar. 25, 2019 (now U.S. Pat. No. 10,614,825 issued on Apr. 7, 2020), which is a continuation and claims the benefit of priority to U.S. patent application Ser. No. 15/985,635 filed on May 21, 2018 (now U.S. Pat. No. 10,242,685 issued on Mar. 26, 2019), which is a divisional and claims priority to Ser. No. 15/031,130 filed on Apr. 21, 2016 (now U.S. Pat. No. 9,978,385 issued on May 22, 2018), which is the U.S. National Stage Entry of International Patent Application No. PCT/EP2014/072570 filed Oct. 21, 2014, which claims the benefit of priority to U.S. Provisional Patent Application No. 61/893,770 filed 21 Oct. 2013; U.S. Provisional Patent Application No. 61/974,544 filed 3 Apr. 2014; and U.S. Provisional Patent Application No. 62/037,693 filed 15 Aug. 2014, each of which is hereby incorporated by reference in its entirety.

TECHNICAL FIELD OF THE INVENTION

The invention disclosed herein generally relates to encoding and decoding of audio signals, and in particular to parametric reconstruction of a multichannel audio signal from a downmix signal and associated metadata.

BACKGROUND OF THE INVENTION

Audio playback systems comprising multiple loudspeakers are frequently used to reproduce an audio scene represented by a multichannel audio signal, wherein the respective channels of the multichannel audio signal are played back on respective loudspeakers. The multichannel audio signal may for example have been recorded via a plurality of acoustic transducers or may have been generated by audio authoring equipment. In many situations, there are bandwidth limitations for transmitting the audio signal to the playback equipment and/or limited space for storing the audio signal in a computer memory or on a portable storage device. There exist audio coding systems for parametric coding of audio signals, so as to reduce the bandwidth or storage size needed. On an encoder side, these systems typically downmix the multichannel audio signal into a downmix signal, which typically is a mono (one channel) or a stereo (two channels) downmix, and extract side information describing the properties of the channels by means of parameters like level differences and cross-correlation. The downmix and the side information are then encoded and sent to a decoder side. On the decoder side, the multichannel audio signal is reconstructed, i.e. approximated, from the downmix under control of the parameters of the side information.

In view of the wide range of different types of devices and systems available for playback of multichannel audio content, including an emerging segment aimed at end-users in their homes, there is a need for new and alternative ways to efficiently encode multichannel audio content, so as to reduce bandwidth requirements and/or the required memory size for storage, and/or to facilitate reconstruction of the multichannel audio signal at a decoder side.

BRIEF DESCRIPTION OF THE DRAWINGS

In what follows, example embodiments will be described in greater detail and with reference to the accompanying drawings, on which.

Figure 1:
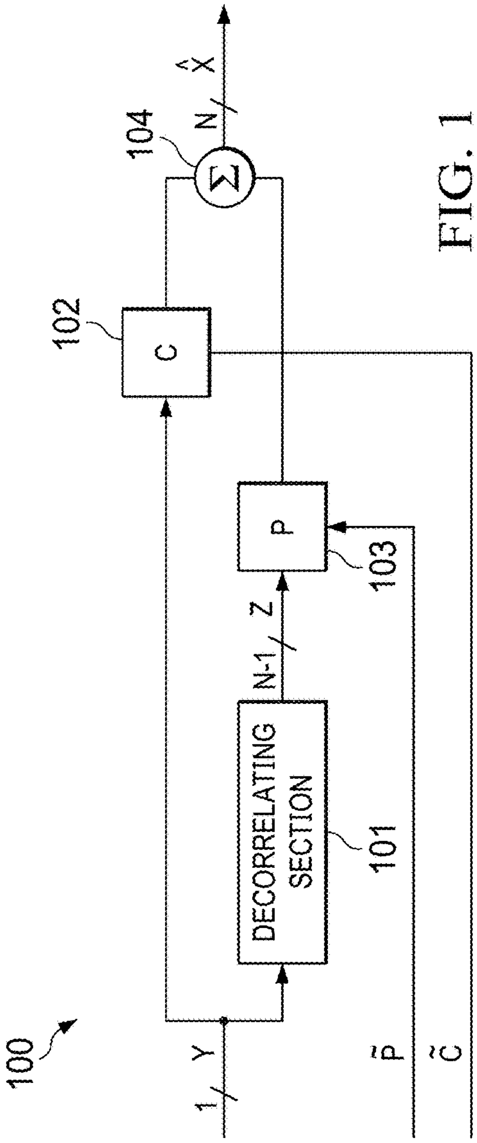
FIG. 1 is a generalized block diagram of a parametric reconstruction section for reconstructing a multichannel audio signal based on a single-channel downmix signal and associated dry and wet upmix parameters, according to an example embodiment.

All the figures are schematic and generally only show parts which are necessary in order to elucidate the invention, whereas other parts may be omitted or merely suggested.

DESCRIPTION OF EXAMPLE EMBODIMENTS

As used herein, an audio signal may be a pure audio signal, an audio part of an audiovisual signal or multimedia signal or any of these in combination with metadata.

As used herein, a channel is an audio signal associated with a predefined/fixed spatial position/orientation or an undefined spatial position such as "left" or "right".

I. Overview

According to a first aspect, example embodiments propose audio decoding systems as well as methods and computer program products for reconstructing an audio signal. The proposed decoding systems, methods and computer program products, according to the first aspect, may generally share the same features and advantages.

According to example embodiments, there is provided a method for reconstructing an N-channel audio signal, wherein $N \geq 3$. The method comprises receiving a single-channel downmix signal, or a channel of a multichannel downmix signal carrying data for reconstruction of more audio signals, together with associated dry and wet upmix parameters; computing a first signal with a plurality of (N) channels, referred to as a dry upmix signal, as a linear mapping of the downmix signal, wherein a set of dry upmix coefficients is applied to the downmix signal as part of computing the dry upmix signal; generating an (N−1)-channel decorrelated signal based on the downmix signal; computing a further signal with a plurality of (N) channels, referred to as a wet upmix signal, as a linear mapping of the decorrelated signal, wherein a set of wet upmix coefficients is applied to the channels of the decorrelated signal as part of computing the wet upmix signal; and combining the dry and wet upmix signals to obtain a multidimensional reconstructed signal corresponding to the N-channel audio signal to be reconstructed. The method further comprises determining the set of dry upmix coefficients based on the received dry upmix parameters; populating an intermediate matrix having more elements than the number of received wet upmix parameters, based on the received wet upmix parameters and knowing that the intermediate matrix belongs to a predefined matrix class; and obtaining the set of wet upmix coefficients by multiplying the intermediate matrix by a predefined matrix, wherein the set of wet upmix coefficients corresponds to the matrix resulting from the multiplication and includes more coefficients than the number of elements in the intermediate matrix.

In this example embodiment, the number of wet upmix coefficients employed for reconstructing the N-channel audio signal is larger than the number of received wet upmix parameters. By exploiting knowledge of the predefined matrix and the predefined matrix class to obtain the wet upmix coefficients from the received wet upmix parameters, the amount of information needed to enable reconstruction of the N-channel audio signal may be reduced, allowing for a reduction of the amount of metadata transmitted together with the downmix signal from an encoder side. By reducing the amount of data needed for parametric reconstruction, the required bandwidth for transmission of a parametric representation of the N-channel audio signal, and/or the required memory size for storing such a representation, may be reduced.

The (N−1)-channel decorrelated signal serves to increase the dimensionality of the content of the reconstructed N-channel audio signal, as perceived by a listener. The channels of the (N−1)-channel decorrelated signal may have at least approximately the same spectrum as the single-channel downmix signal, or may have spectra corresponding to rescaled/normalized versions of the spectrum of the single-channel downmix signal, and may form, together with the single-channel downmix signal, N at least approximately mutually uncorrelated channels. In order to provide a faithful reconstruction of the channels of the N-channel audio signal, each of the channels of the decorrelated signal preferably has such properties that it is perceived by a listener as similar to the downmix signal. Hence, although it is possible to synthesize mutually uncorrelated signals with a given spectrum from e.g. white noise, the channels of the decorrelated signal are preferably derived by processing the downmix signal, e.g. including applying respective all-pass filters to the downmix signal or recombining portions of the downmix signal, so as to preserve as many properties as possible, especially locally stationary properties, of the downmix signal, including relatively more subtle, psychoacoustically conditioned properties of the downmix signal, such as timbre.

Combining the wet and dry upmix signals may include adding audio content from respective channels of the wet upmix signal to audio content of the respective corresponding channels of the dry upmix signal, such as additive mixing on a per-sample or per-transform-coefficient basis.

The predefined matrix class may be associated with known properties of at least some matrix elements which are valid for all matrices in the class, such as certain relationships between some of the matrix elements, or some matrix elements being zero. Knowledge of these properties allows for populating the intermediate matrix based on fewer wet upmix parameters than the full number of matrix elements in the intermediate matrix. The decoder side has knowledge at least of the properties of, and relationships between, the elements it needs to compute all matrix elements on the basis of the fewer wet upmix parameters.

By the dry upmix signal being a linear mapping of the downmix signal is meant that the dry upmix signal is obtained by applying a first linear transformation to the downmix signal. This first transformation takes one channel as input and provides N channels as output, and the dry upmix coefficients are coefficients defining the quantitative properties of this first linear transformation.

By the wet upmix signal being a linear mapping of the decorrelated signal is meant that the wet upmix signal is obtained by applying a second linear transformation to the decorrelated signal. This second transformation takes N−1 channels as input and provides N channels as output, and the wet upmix coefficients are coefficients defining the quantitative properties of this second linear transformation.

In an example embodiment, receiving the wet upmix parameters may include receiving $N(N-1)/2$ wet upmix parameters. In the present example embodiment, populating the intermediate matrix may include obtaining values for $(N-1)^2$ matrix elements based on the received $N(N-1)/2$ wet upmix parameters and knowing that the intermediate matrix belongs to the predefined matrix class. This may include inserting the values of the wet upmix parameters immediately as matrix elements, or processing the wet upmix parameters in a suitable manner for deriving values for the matrix elements. In the present example embodiment, the predefined matrix may include $N(N-1)$ elements, and the set of wet upmix coefficients may include $N(N-1)$ coefficients. For example, receiving the wet upmix parameters may include receiving no more than $N(N-1)/2$ independently assignable wet upmix parameters and/or the number of received wet upmix parameters may be no more than half the number of wet upmix coefficients employed for reconstructing the N-channel audio signal.

It is to be understood that omitting a contribution from a channel of the decorrelated signal when forming a channel of the wet upmix signal as a linear mapping of the channels of the decorrelated signal corresponds to applying a coefficient with the value zero to that channel, i.e. omitting a contribution from a channel does not affect the number of coefficients applied as part of the linear mapping.

In an example embodiment, populating the intermediate matrix may include employing the received wet upmix parameters as elements in the intermediate matrix. Since the received wet upmix parameters are employed as elements in the intermediate matrix without being processed any further, the complexity of the computations required for populating the intermediate matrix, and to obtain the upmix coefficients may be reduced, allowing for a computationally more efficient reconstruction of the N-channel audio signal.

In an example embodiment, receiving the dry upmix parameters may include receiving (N−1) dry upmix parameters. In the present example embodiment, the set of dry upmix coefficients may include N coefficients, and the set of dry upmix coefficients is determined based on the received (N−1) dry upmix parameters and based on a predefined relation between the coefficients in the set of dry upmix coefficients. For example, receiving the dry upmix parameters may include receiving no more than (N−1) independently assignable dry upmix parameters. For example, the downmix signal may be obtainable, according to a predefined rule, as a linear mapping of the N-channel audio signal to be reconstructed, and the predefined relation between the dry upmix coefficients may be based on the predefined rule.

In an example embodiment, the predefined matrix class may be one of: lower or upper triangular matrices, wherein known properties of all matrices in the class include predefined matrix elements being zero; symmetric matrices, wherein known properties of all matrices in the class include predefined matrix elements (on either side of the main diagonal) being equal; and products of an orthogonal matrix and a diagonal matrix, wherein known properties of all matrices in the class include known relations between predefined matrix elements. In other words, the predefined matrix class may be the class of lower triangular matrices, the class of upper triangular matrices, the class of symmetric matrices or the class of products of an orthogonal matrix and a diagonal matrix. A common property of each of the above classes is that its dimensionality is less than the full number of matrix elements.

In an example embodiment, the downmix signal may be obtainable, according to a predefined rule, as a linear mapping of the N-channel audio signal to be reconstructed. In the present example embodiment, the predefined rule may define a predefined downmix operation, and the predefined matrix may be based on vectors spanning the kernel space of the predefined downmix operation. For example, the rows or columns of the predefined matrix may be vectors forming a basis, e.g. an orthonormal basis, for the kernel space of the predefined downmix operation.

In an example embodiment, receiving the single-channel downmix signal together with associated dry and wet upmix parameters may include receiving a time segment or time/frequency tile of the downmix signal together with dry and wet upmix parameters associated with that time segment or time/frequency tile. In the present example embodiment, the multidimensional reconstructed signal may correspond to a time segment or time/frequency tile of the N-channel audio signal to be reconstructed. In other words, the reconstruction of the N-channel audio signal may in at least some example embodiments be performed one time segment or time/frequency tile at a time. Audio encoding/decoding systems typically divide the time-frequency space into time/frequency tiles, e.g. by applying suitable filter banks to the input audio signals. By a time/frequency tile is generally meant a portion of the time-frequency space corresponding to a time interval/segment and a frequency sub-band.

According to example embodiments, there is provided an audio decoding system comprising a first parametric reconstruction section configured to reconstruct an N-channel audio signal based on a first single-channel downmix signal and associated dry and wet upmix parameters, wherein $N \geq 3$. The first parametric reconstruction section comprises a first decorrelating section configured to receive the first downmix signal and to output, based thereon, a first $N-1$-channel decorrelated signal. The first parametric reconstruction section also comprises a first dry upmix section configured to: receive the dry upmix parameters and the downmix signal; determine a first set of dry upmix coefficients based on the dry upmix parameters; and output a first dry upmix signal computed by mapping the first downmix signal linearly in accordance with the first set of dry upmix coefficients. In other words, the channels of the first dry upmix signal are obtained by multiplying the single-channel downmix signal by respective coefficients, which may be the dry upmix coefficients themselves, or which may be coefficients controllable via the dry upmix coefficients. The first parametric reconstruction section further comprises a first wet upmix section configured to: receive the wet upmix parameters and the first decorrelated signal; populate a first intermediate matrix having more elements than the number of received wet upmix parameters, based on the received wet upmix parameters and knowing that the first intermediate matrix belongs to a first predefined matrix class, i.e. by employing properties of certain matrix elements known to hold for all matrices in the predefined matrix class; obtain a first set of wet upmix coefficients by multiplying the first intermediate matrix by a first predefined matrix, wherein the first set of wet upmix coefficients corresponds to the matrix resulting from the multiplication and includes more coefficients than the number of elements in the first intermediate matrix; and output a first wet upmix signal computed by mapping the first decorrelated signal linearly in accordance with the first set of wet upmix coefficients, i.e. by forming linear combinations of the channels of the decorrelated signal employing the wet upmix coefficients. The first parametric reconstruction section also comprises a first combining section configured to receive the first dry upmix signal and the first wet upmix signal and to combine these signals to obtain a first multidimensional reconstructed signal corresponding to the N-dimensional audio signal to be reconstructed.

In an example embodiment, the audio decoding system may further comprise a second parametric reconstruction section operable independently of the first parametric reconstruction section and configured to reconstruct an $N_2$-channel audio signal based on a second single-channel downmix signal and associated dry and wet upmix parameters, wherein $N_2 \geq 2$. It may for example hold that $N_2=2$ or that $N_2 \geq 3$. In the present example embodiment, the second parametric reconstruction section may comprise a second decorrelating section, a second dry upmix section, a second wet upmix section and a second combining section, and the sections of the second parametric reconstruction section may be configured analogously to the corresponding sections of the first parametric reconstruction section. In the present example embodiment, the second wet upmix section may be configured to employ a second intermediate matrix belonging to a second predefined matrix class and a second predefined matrix. The second predefined matrix class and the second predefined matrix may be different than, or equal to, the first predefined matrix class and the first predefined matrix, respectively.

In an example embodiment, the audio decoding system may be adapted to reconstruct a multichannel audio signal based on a plurality of downmix channels and associated dry and wet upmix parameters. In the present example embodiment, the audio decoding system may comprise: a plurality of reconstruction sections, including parametric reconstruction sections operable to independently reconstruct respective sets of audio signal channels based on respective downmix channels and respective associated dry and wet upmix parameters; and a control section configured to receive signaling indicating a coding format of the multichannel audio signal corresponding to a partition of the channels of the multichannel audio signal into sets of channels represented by the respective downmix channels and, for at least some of the downmix channels, by respective associated dry and wet upmix parameters. In the present example embodiment, the coding format may further correspond to a set of predefined matrices for obtaining wet upmix coefficients associated with at least some of the respective sets of channels based on the respective wet upmix parameters. Optionally, the coding format may further correspond to a set of predefined matrix classes indicating how respective intermediate matrices are to be populated based on the respective sets of wet upmix parameters.

In the present example embodiment, the decoding system may be configured to reconstruct the multichannel audio signal using a first subset of the plurality of reconstruction sections, in response to the received signaling indicating a first coding format. In the present example embodiment, the decoding system may be configured to reconstruct the multichannel audio signal using a second subset of the plurality of reconstruction sections, in response to the received signaling indicating a second coding format, and at least one of the first and second subsets of the reconstruction sections may comprise the first parametric reconstruction section.

Depending on the composition of the audio content of the multichannel audio signal, the available bandwidth for transmission from an encoder side to a decoder side, the required playback quality as perceived by a listener and/or the required fidelity of the audio signal as reconstructed on a decoder side, the most appropriate coding format may differ between different applications and/or time periods. By supporting multiple coding formats for the multichannel audio signal, the audio decoding system in the present example embodiment allows an encoder side to employ a coding format more specifically suited for the current circumstances.

In an example embodiment, the plurality of reconstruction sections may include a single-channel reconstruction section operable to independently reconstruct a single audio channel based on a downmix channel in which no more than a single audio channel has been encoded. In the present example embodiment, at least one of the first and second subsets of the reconstruction sections may comprise the single-channel reconstruction section. Some channels of the multichannel audio signal may be particularly important for the overall impression of the multichannel audio signal, as perceived by a listener. By employing the single-channel reconstruction section to encode e.g. such a channel separately in its own downmix channel, while other channels are parametrically encoded together in other downmix channels, the fidelity of the multichannel audio signal as reconstructed may be increased. In some example embodiments, the audio content of one channel of the multichannel audio signal may be of a different type than the audio content of the other channels of the multichannel audio signal, and the fidelity of the multichannel audio signal as reconstructed may be increased by employing a coding format in which that channel is encoded separately in a downmix channel of its own.

In an example embodiment, the first coding format may correspond to reconstruction of the multichannel audio signal from a lower number of downmix channels than the second coding format. By employing a lower number of downmix channels, the required bandwidth for transmission from an encoder side to a decoder side may be reduced. By employing a higher number of downmix channels, the fidelity and/or the perceived audio quality of the multichannel audio signal as reconstructed may be increased.

According to a second aspect, example embodiments propose audio encoding systems as well as methods and computer program products for encoding a multichannel audio signal. The proposed encoding systems, methods and computer program products, according to the second aspect, may generally share the same features and advantages. Moreover, advantages presented above for features of decoding systems, methods and computer program products, according to the first aspect, may generally be valid for the corresponding features of encoding systems, methods and computer program products according to the second aspect.

According to example embodiments, there is provided a method for encoding an N-channel audio signal as a single-channel downmix signal and metadata suitable for parametric reconstruction of the audio signal from the downmix signal and an (N−1)-channel decorrelated signal determined based on the downmix signal, wherein $N \geq 3$. The method comprises: receiving the audio signal; computing, according to a predefined rule, the single-channel downmix signal as a linear mapping of the audio signal; and determining a set of dry upmix coefficients in order to define a linear mapping of the downmix signal approximating the audio signal, e.g. via a minimum mean square error approximation under the assumption that only the downmix signal is available for the reconstruction. The method further comprises determining an intermediate matrix based on a difference between a covariance of the audio signal as received and a covariance of the audio signal as approximated by the linear mapping of the downmix signal, wherein the intermediate matrix when multiplied by a predefined matrix corresponds to a set of wet upmix coefficients defining a linear mapping of the decorrelated signal as part of parametric reconstruction of the audio signal, and wherein the set of wet upmix coefficients includes more coefficients than the number of elements in the intermediate matrix. The method further comprises outputting the downmix signal together with dry upmix parameters, from which the set of dry upmix coefficients is derivable, and wet upmix parameters, wherein the intermediate matrix has more elements than the number of output wet upmix parameters, and wherein the intermediate matrix is uniquely defined by the output wet upmix parameters provided that the intermediate matrix belongs to a predefined matrix class.

A parametric reconstruction copy of the audio signal at a decoder side includes, as one contribution, a dry upmix signal formed by the linear mapping of the downmix signal and, as a further contribution, a wet upmix signal formed by the linear mapping of the decorrelated signal. The set of dry upmix coefficients defines the linear mapping of the downmix signal and the set of wet upmix coefficients defines the linear mapping of the decorrelated signals. By outputting wet upmix parameters which are fewer than the number of wet upmix coefficients, and from which the wet upmix coefficients are derivable based on the predefined matrix and the predefined matrix class, the amount of information sent to a decoder side to enable reconstruction of the N-channel audio signal may be reduced. By reducing the amount of data needed for parametric reconstruction, the required bandwidth for transmission of a parametric representation of the N-channel audio signal, and/or the required memory size for storing such a representation, may be reduced.

The intermediate matrix may be determined based on the difference between the covariance of the audio signal as received and the covariance of the audio signal as approximated by the linear mapping of the downmix signal, e.g. for a covariance of the signal obtained by the linear mapping of the decorrelated signal to supplement the covariance of the audio signal as approximated by the linear mapping of the downmix signal.

In an example embodiment, determining the intermediate matrix may include determining the intermediate matrix such that a covariance of the signal obtained by the linear mapping of the decorrelated signal, defined by the set of wet upmix coefficients, approximates, or substantially coincides with, the difference between the covariance of the audio signal as received and the covariance of the audio signal as approximated by the linear mapping of the downmix signal. In other words, the intermediate matrix may be determined such that a reconstruction copy of the audio signal, obtained as a sum of a dry upmix signal formed by the linear mapping of the downmix signal and a wet upmix signal formed by the linear mapping of the decorrelated signal completely, or at least approximately, reinstates the covariance of the audio signal as received.

In an example embodiment, outputting the wet upmix parameters may include outputting no more than N(N−1)/2 independently assignable wet upmix parameters. In the present example embodiment, the intermediate matrix may have $(N-1)^2$ matrix elements and may be uniquely defined by the output wet upmix parameters provided that the intermediate matrix belongs to the predefined matrix class. In the present example embodiment, the set of wet upmix coefficients may include N(N−1) coefficients.

In an example embodiment, the set of dry upmix coefficients may include N coefficients. In the present example embodiments, outputting the dry upmix parameters may include outputting no more than N−1 dry upmix parameters, and the set of dry upmix coefficients may be derivable from the N−1 dry upmix parameters using the predefined rule.

In an example embodiment, the determined set of dry upmix coefficients may define a linear mapping of the downmix signal corresponding to a minimum mean square error approximation of the audio signal, i.e. among the set of linear mappings of the downmix signal, the determined set of dry upmix coefficients may define the linear mapping which best approximates the audio signal in a minimum mean square sense.

According to example embodiments, there is provided an audio encoding system comprising a parametric encoding section configured to encode an N-channel audio signal as a single-channel downmix signal and metadata suitable for parametric reconstruction of the audio signal from the downmix signal and an (N−1)-channel decorrelated signal determined based on the downmix signal, wherein N≥3. The parametric encoding section comprises: a downmix section configured to receive the audio signal and to compute, according to a predefined rule, the single-channel downmix signal as a linear mapping of the audio signal; and a first analyzing section configured to determine a set of dry upmix coefficients in order to define a linear mapping of the downmix signal approximating the audio signal. The parametric encoding section further comprises a second analyzing section configured to determine an intermediate matrix based on a difference between a covariance of the audio signal as received and a covariance of the audio signal as approximated by the linear mapping of the downmix signal, wherein the intermediate matrix when multiplied by a predefined matrix corresponds to a set of wet upmix coefficients defining a linear mapping of the decorrelated signal as part of parametric reconstruction of the audio signal, wherein the set of wet upmix coefficients includes more coefficients than the number of elements in the intermediate matrix. The parametric encoding section is further configured to output the downmix signal together with dry upmix parameters, from which the set of dry upmix coefficients is derivable, and wet upmix parameters, wherein the intermediate matrix has more elements than the number of output wet upmix parameters, and wherein the intermediate matrix is uniquely defined by the output wet upmix parameters provided that the intermediate matrix belongs to a predefined matrix class.

In an example embodiment, the audio encoding system may be configured to provide a representation of a multichannel audio signal in the form of a plurality of downmix channels and associated dry and wet upmix parameters. In the present example embodiment, the audio encoding system may comprise: a plurality of encoding sections, including parametric encoding sections operable to independently compute respective downmix channels and respective associated upmix parameters based on respective sets of audio signal channels. In the present example embodiment, the audio encoding system may further comprise a control section configured to determine a coding format for the multichannel audio signal corresponding to a partition of the channels of the multichannel audio signal into sets of channels to be represented by the respective downmix channels and, for at least some of the downmix channels, by respective associated dry and wet upmix parameters. In the present example embodiment, the coding format may further correspond to a set of predefined rules for computing at least some of the respective downmix channels. In the present example embodiment, the audio encoding system may be configured to encode the multichannel audio signal using a first subset of the plurality of encoding sections, in response to the determined coding format being a first coding format. In the present example embodiment, the audio encoding system may be configured to encode the multichannel audio signal using a second subset of the plurality of encoding sections, in response to the determined coding format being a second coding format, and at least one of the first and second subsets of the encoding sections may comprise the first parametric encoding section. In the present example embodiment, the control section may for example determine the coding format based on an available bandwidth for transmitting an encoded version of the multichannel audio signal to a decoder side, based on the audio content of the channels of the multichannel audio signal and/or based on an input signal indicating a desired coding format.

In an example embodiment, the plurality of encoding sections may include a single-channel encoding section operable to independently encode no more than a single audio channel in a downmix channel, and at least one of the first and second subsets of the encoding sections may comprise the single-channel encoding section.

According to example embodiments, there is provided a computer program product comprising a computer-readable medium with instructions for performing any of the methods of the first and second aspects.

According to example embodiments, it may hold that N=3 or N=4 in any of the methods, encoding systems, decoding systems and computer program products of the first and second aspects.

Further example embodiments are defined in the dependent claims. It is noted that example embodiments include all combinations of features, even if recited in mutually different claims.

II. Example Embodiments

On an encoder side, which will be described with reference to FIGS. 3 and 4, a single-channel downmix signal Y is computed as a linear mapping of an N-channel audio signal $X=[x_1 \ldots x_N]^T$ according to $$Y = [d_1 \ \ldots \ d_N]\begin{bmatrix} x_1 \\ x_2 \\ x_3 \end{bmatrix} = \sum_{n=1}^{N} d_n x_n = DX, \tag{1}$$

where $d_n$, n=1, . . . , N, are downmix coefficients represented by a downmix matrix D. On a decoder side, which will be described with reference to FIGS. 1 and 2, parametric reconstruction of the N-channel audio signal X is performed according to $$\hat{X}=\begin{bmatrix}c_1\\c_2\\\vdots\\c_N\end{bmatrix}Y+\begin{bmatrix}p_{11}&\cdots&p_{1,N-1}\\p_{21}&\cdots&p_{2,N-1}\\\vdots&\ddots&\vdots\\p_{N,1}&\cdots&p_{N,N-1}\end{bmatrix}\begin{bmatrix}z_1\\\vdots\\z_{N-1}\end{bmatrix}=Cy+PZ,\qquad(2)$$

where $c_n$, n=1, . . . , N, are dry upmix coefficients represented by a matrix dry upmix matrix C, $p_{n,k}$, n=1, . . . , N, k=1, . . . N−1, are wet upmix coefficients represented by a wet upmix matrix P, and $z_k$, k=1, . . . , N−1 are the channels of an (N−1)-channel decorrelated signal Z generated based on the downmix signal Y. If the channels of each audio signal are represented as rows, the covariance matrix of the original audio signal X may be expressed as $R=XX^T$, and the covariance matrix of the audio signal as reconstructed $\hat{X}$ may be expressed as $\hat{R}=\hat{X}\hat{X}^T$. It is to be noted that if for example the audio signals are represented as rows comprising complex-valued transform coefficients, the real part of XX*, where X* is the complex conjugate transpose of the matrix X, may for example be considered instead of $XX^T$.

In order to provide a faithful reconstruction of the original audio signal X, it may be advantageous for the reconstruction given by equation (2) to reinstate full covariance, i.e., it may be advantageous to employ dry and wet upmix matrices C and P such that $$R=\hat{R}.\qquad(3)$$

One approach is to first find a dry upmix matrix C giving the best possible "dry" upmix $\hat{X}_0=CY$ in the least squares sense, by solving the normal equations $$CYY^T=XY^T.\qquad(4)$$

For $\hat{X}_0=CY$, with a matrix C solving equation (4), it holds that $$R=\hat{X}_0\hat{X}_0^T+(\hat{X}_0-X)(\hat{X}_0-X)^T=R_0+\Delta R.\qquad(5)$$

Assuming that the channels of the decorrelated signal Z are mutually uncorrelated and all have the same energy $\|Y\|^2$ equal to that of the single-channel downmix signal Y, the positive definite missing covariance ΔR can be factorized according to $$\Delta R=PP^T\|Y\|^2.\qquad(6)$$

Full covariance may be reinstated according to equation (3) by employing a dry upmix matrix C solving equation (4) and a wet upmix matrix P solving equation (6). Equations (1) and (4) imply that $DCYY^T=YY^T$, and thereby that $$\Sigma_{n=1}^{N}d_nc_n=DC=1,\qquad(7)$$

for non-degenerate downmix matrices D. Equations (5) and (7) imply that $D(X_0-X)=DCY-Y=0$ and $$D\Delta R=0.\qquad(8)$$

Hence, the missing covariance ΔR has rank N−1, and may indeed be provided by employing a decorrelated signal Z with N−1 mutually uncorrelated channels. Equation (6) and (8) imply that DP=0, so that the columns of the wet upmix matrix P solving equation (6) can be constructed from vectors spanning the kernel space of the downmix matrix D. The computations for finding a suitable wet upmix matrix P may therefore be moved to that lower-dimensional space.

Let V be a matrix of size N(N−1) containing an orthonormal basis for the kernel space of the downmix matrix D, i.e. a linear space of vectors v with Dv=0. Examples of such predefined matrixes V for N=2, N=3, and N=4, respectively, are $$\frac{1}{\sqrt{2}}\begin{bmatrix}-1\\1\end{bmatrix}\begin{bmatrix}1/\sqrt{2}&1/\sqrt{6}\\0&-2/\sqrt{6}\\-1/\sqrt{2}&1/\sqrt{6}\end{bmatrix}\text{ and }\frac{1}{2}\begin{bmatrix}1&1&1\\1&-1&-1\\-1&-1&1\\-1&1&-1\end{bmatrix}.\qquad(9)$$

In the basis given by V, the missing covariance can be expressed as $R_v=V^T(\Delta R)V$. To find a wet upmix matrix P solving equation (6) one may therefore first find a matrix H by solving $R_v=HH^T$, and then obtain P as $P=VH/\|Y\|$, where $\|Y\|$ is the square root of the energy of the single-channel downmix signal Y. Other suitable upmix matrices P may be obtained as $P=VHO/\|Y\|$, where O is an orthogonal matrix. Alternatively, one may rescale the missing covariance $R_v$ by the energy $\|Y\|^2$ of the single-channel downmix signal Y and instead solve the equation $$\frac{R_V}{\|Y\|^2}=H_RH_R^T,\qquad(10)$$

where $H=H_R\|Y\|$, and obtain P as $$P=VH_R.\qquad(11)$$

When the entries of $H_R$ are quantized and the desired output has a silent channel, the properties of the predefined matrix V as stated above may be inconvenient. As an example, for N=3, a better choice for the second matrix of (9) would be $$\begin{bmatrix}1/\sqrt{2}&1/\sqrt{2}\\0&-1/\sqrt{2}\\-1/\sqrt{2}&0\end{bmatrix}.\qquad(12)$$

Fortunately, the requirement that the columns of the matrix V are pairwise orthogonal can be dropped as long as these columns are linearly independent. The desired solution $R_v$ to $\Delta R=VR_vV^T$ is then obtained by $R_v=W^T(\Delta R)W$ with=V $(V^TV)^{-1}$, the pseudoinverse of V. The matrix $R_v$ is a positive semi-definite matrix of size $(N-1)^2$ and there are several approaches to finding solutions to equation (10), leading to solutions within respective matrix classes of dimension N(N−1)/2, i.e. in which the matrices are uniquely defined by N(N−1)/2 matrix elements. Solutions may for example be obtained by employing:

a. Cholesky factorization, leading to a lower a triangular $H_R$;

b. positive square root, leading to a symmetric positive semi-definite $H_R$; or c. polar, leading to $H_N$ of the form $H_R=O\Lambda$, where O is orthogonal and Λ is diagonal.

Moreover, there are normalized version of the options a) and b) in which $H_R$ may be expressed as $H_R=\Lambda H_0$, where Λ is diagonal and $H_0$ has all diagonal elements equal to one. The alternatives a, b and c, above, provide solutions $H_R$ in different matrix classes, i.e. lower triangular matrices, symmetric matrices and products of diagonal and orthogonal matrices. If the matrix class to which $H_R$ belongs is known at a decoder side, i.e. if it is known that $H_R$ belongs to a predefined matrix class, e.g. according to any the above alternatives a, b and c, $H_R$ may be populated based on only N(N−1)/2 of its elements. If also the matrix V is known at the decoder side, e.g. if it is known that V is one of the matrices given in (9), the wet upmix matrix P, needed for reconstruction according to equation (2), may then be obtained via equation (11).

Figure 3:
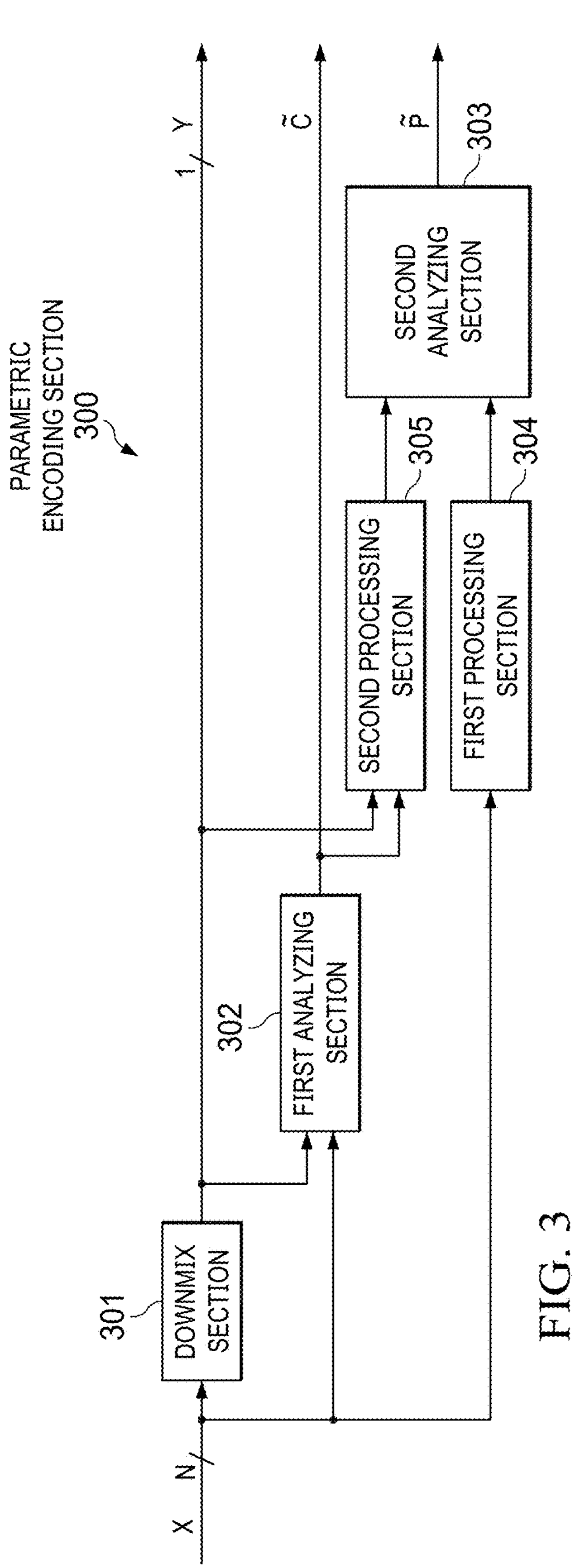
FIG. 3 is a generalized block diagram of a parametric encoding section for encoding a multichannel audio signal as a single-channel downmix signal and associated metadata, according to an example embodiment.

FIG. 3 is a generalized block diagram of a parametric encoding section 300 according to an example embodiment. The parametric encoding section 300 is configured to encode an N-channel audio signal X as a single-channel downmix signal Y and metadata suitable for parametric reconstruction of the audio signal X according to equation (2). The parametric encoding section 300 comprises a downmix section 301, which receives the audio signal X and computes, according to a predefined rule, the single-channel downmix signal Y as a linear mapping of the audio signal X. In the present example embodiment, the downmix section 301 computes the downmix signal Y according to equation (1), wherein the downmix matrix D is predefined and corresponds to the predefined rule. A first analyzing section 302 determines a set of dry upmix coefficients, represented by the dry upmix matrix C, in order to define a linear mapping of the downmix signal Y approximating the audio signal X. This linear mapping of the downmix signal Y is denoted by CY in equation (2). In the present example embodiment, N dry upmix coefficients C are determined according to equation (4) such that the linear mapping CY of the downmix signal Y corresponds to a minimum mean square approximation of the audio signal X. A second analyzing section 303 determines an intermediate matrix $H_R$ based on a difference between the covariance matrix of the audio signal X as received and the covariance matrix of the audio signal as approximated by the linear mapping CY of the downmix signal Y. In the present example embodiment, the covariance matrices are computed by first and second processing sections 304, 305, respectively, and are then provided to the second analyzing section 303. In the present example embodiment, the intermediate matrix $H_R$ is determined according to above described approach b to solving equation (10), leading to an intermediate matrix $H_R$ which is symmetric. As indicated in equations (1) and (11), the intermediate matrix $H_R$, when multiplied by a predefined matrix V, defines, via a set of wet upmix parameters P, a linear mapping PZ of a decorrelated signal Z as part of parametric reconstruction of the audio signal X at a decoder side. In the present example embodiment, the intermediate matrix V is the second matrix in (9) for the case N=3, and the third matrix in (9) for the case N=4. The parametric encoding section 300 outputs the downmix signal Y together with dry upmix parameters $\tilde{C}$ and wet upmix parameters $\tilde{P}$. In the present example embodiment, N−1 of the N dry upmix coefficients C are the dry upmix parameters $\tilde{C}$, and the remaining one dry upmix coefficient is derivable from the dry upmix parameters $\tilde{C}$ via equation (7) if the predefined downmix matrix D is known. Since the intermediate matrix $H_R$ belongs to the class of symmetric matrices, it is uniquely defined by N(N−1)/2 of its $(N-1)^2$ elements. In the present example embodiment, N(N−1)/2 of the elements of the intermediate matrix $H_R$ are therefore wet upmix parameters $\tilde{P}$ from which the rest of the intermediate matrix $H_R$ is derivable knowing that it is symmetric.

Figure 4:
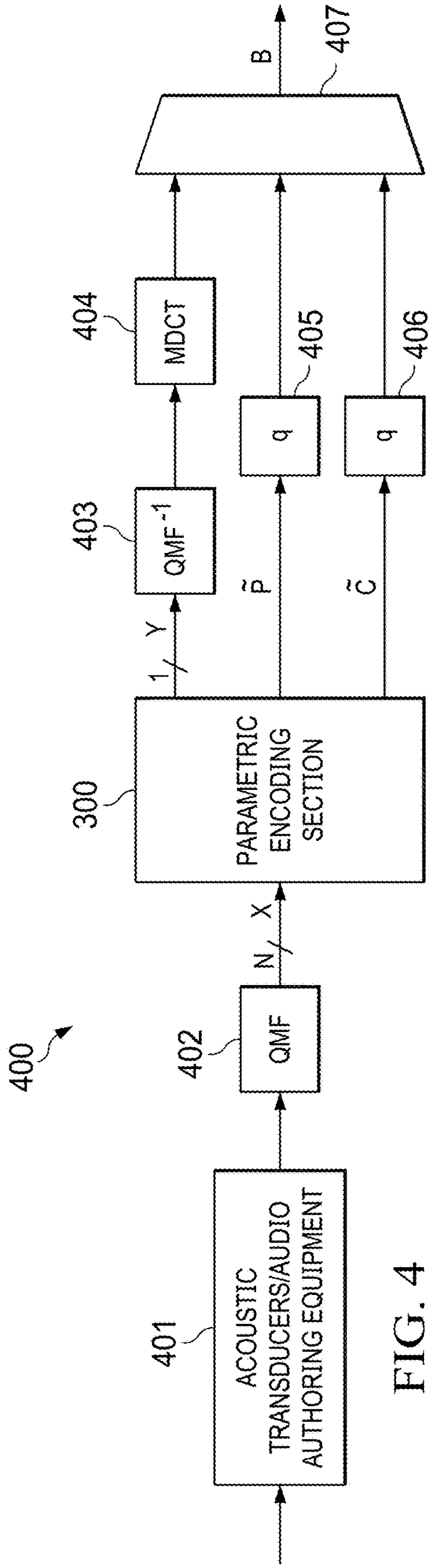
FIG. 4 is a generalized block diagram of an audio encoding system comprising the parametric encoding section depicted in FIG. 3, according to an example embodiment.

FIG. 4 is a generalized block diagram of an audio encoding system 400 according to an example embodiment, comprising the parametric encoding section 300 described with reference to FIG. 3. In the present example embodiment, audio content, e.g. recorded by one or more acoustic transducers 401, or generated by audio authoring equipment 401, is provided in the form of the N-channel audio signal X. A quadrature mirror filter (QMF) analysis section 402 transforms the audio signal X, time segment by time segment, into a QMF domain for processing by the parametric encoding section 300 of the audio signal X in the form of time/frequency tiles. The downmix signal Y output by the parametric encoding section 300 is transformed back from the QMF domain by a QMF synthesis section 403 and is transformed into a modified discrete cosine transform (MDCT) domain by a transform section 404. Quantization sections 405 and 406 quantize the dry upmix parameters $\tilde{C}$ and wet upmix parameters $\tilde{P}$, respectively. For example, uniform quantization with a step size of 0.1 or 0.2 (dimensionless) may be employed, followed by entropy coding in the form of Huffman coding. A coarser quantization with step size 0.2 may for example be employed to save transmission bandwidth, and a finer quantization with step size 0.1 may for example be employed to improve fidelity of the reconstruction on a decoder side. The MDCT-transformed downmix signal Y and the quantized dry upmix parameters $\tilde{C}$ and wet upmix parameters $\tilde{P}$ are then combined into a bitstream B by a multiplexer 407, for transmission to a decoder side. The audio encoding system 400 may also comprise a core encoder (not shown in FIG. 4) configured to encode the downmix signal Y using a perceptual audio codec, such as Dolby Digital or MPEG AAC, before the downmix signal Y is provided to the multiplexer 407.

FIG. 1 is a generalized block diagram of a parametric reconstruction section 100, according to an example embodiment, configured to reconstruct the N-channel audio signal X based on a single-channel downmix signal Y and associated dry upmix parameters $\tilde{C}$ and wet upmix parameters $\tilde{P}$. The parametric reconstruction section 100 is adapted to perform reconstruction according to equation (2), i.e. using dry upmix parameters C and wet upmix parameters P. However, instead of receiving the dry upmix parameters C and the wet upmix parameters P themselves, dry upmix parameters $\tilde{C}$ and wet upmix parameters $\tilde{P}$ are received from which the dry upmix parameters C and wet upmix parameters P are derivable. A decorrelating section 101 receives the downmix signal Y and outputs, based thereon, a (N−1)-channel decorrelated signal $Z=[z_1 \ldots z_{N-1}]^T$. In the present example embodiment, the channels of the decorrelated signal Z are derived by processing the downmix signal Y, including applying respective all-pass filters to the downmix signal Y, so as to provide channels that are uncorrelated to the downmix signal Y, and with audio content which is spectrally similar to and also perceived as similar to that of the downmix signal Y by a listener. The (N−1)-channel decorrelated signal Z serves to increase the dimensionality of the reconstructed version $\hat{X}$ of N-channel audio signal X, as perceived by a listener. In the present example embodiment, the channels of the decorrelated signal Z have at least approximately the same spectra as that of the single-channel downmix signal Y and form, together with the single-channel downmix signal Y, N at least approximately mutually uncorrelated channels. A dry upmix section 102 receives the dry upmix parameters $\tilde{C}$ and the downmix signal Y. In the present example embodiment, the dry upmix parameters $\tilde{C}$ coincide with the first N−1 of the N dry upmix coefficients C, and the remaining dry upmix coefficient is determined based on a predefined relation between the dry upmix coefficients C given by equation (7). The dry upmix section 102 outputs a dry upmix signal computed by mapping the downmix signal Y linearly in accordance with the set of dry upmix coefficients C, and denoted by CY in equation (2). A wet upmix section 103 receives the wet upmix parameters $\tilde{P}$ and the decorrelated signal Z. In the present example embodiment, the wet upmix parameters $\tilde{P}$ are N(N−1)/2 elements of the intermediate matrix $H_R$ determined at the encoder side according to equation (10). In the present example embodiment, the wet upmix section 103 populates the remaining elements of the intermediate matrix $H_R$ knowing that the intermediate matrix $H_R$ belongs to a predefined matrix class, i.e. that it is symmetric, and exploiting the corresponding relationships between the elements of the matrix. The wet upmix section 103 then obtains a set of wet upmix coefficients P by employing equation (11), i.e. by multiplying the intermediate matrix $H_R$ by the predefined matrix V, i.e. the second matrix in (9) for the case N=3, and the third matrix in (9) for the case N=4. Hence, the N(N−1) wet upmix coefficients P are derived from the received N(N−1)/2 independently assignable wet upmix parameters $\tilde{P}$. The wet upmix section 103 outputs a wet upmix signal computed by mapping the decorrelated signal Z linearly in accordance with the set of wet upmix coefficients P, and denoted by PZ in equation (2). A combining section 104 receives the dry upmix signal CY and the wet upmix signal PZ and combines these signals to obtain a first multidimensional reconstructed signal $\hat{X}$ corresponding to the N-channel audio signal X to be reconstructed. In the present example embodiment, the combining section 104 obtains the respective channels of the reconstructed signal $\hat{X}$ by combining the audio content of the respective channels of the dry upmix signal CY with the respective channels of the wet upmix signal PZ, according to equation (2).

Figure 2:
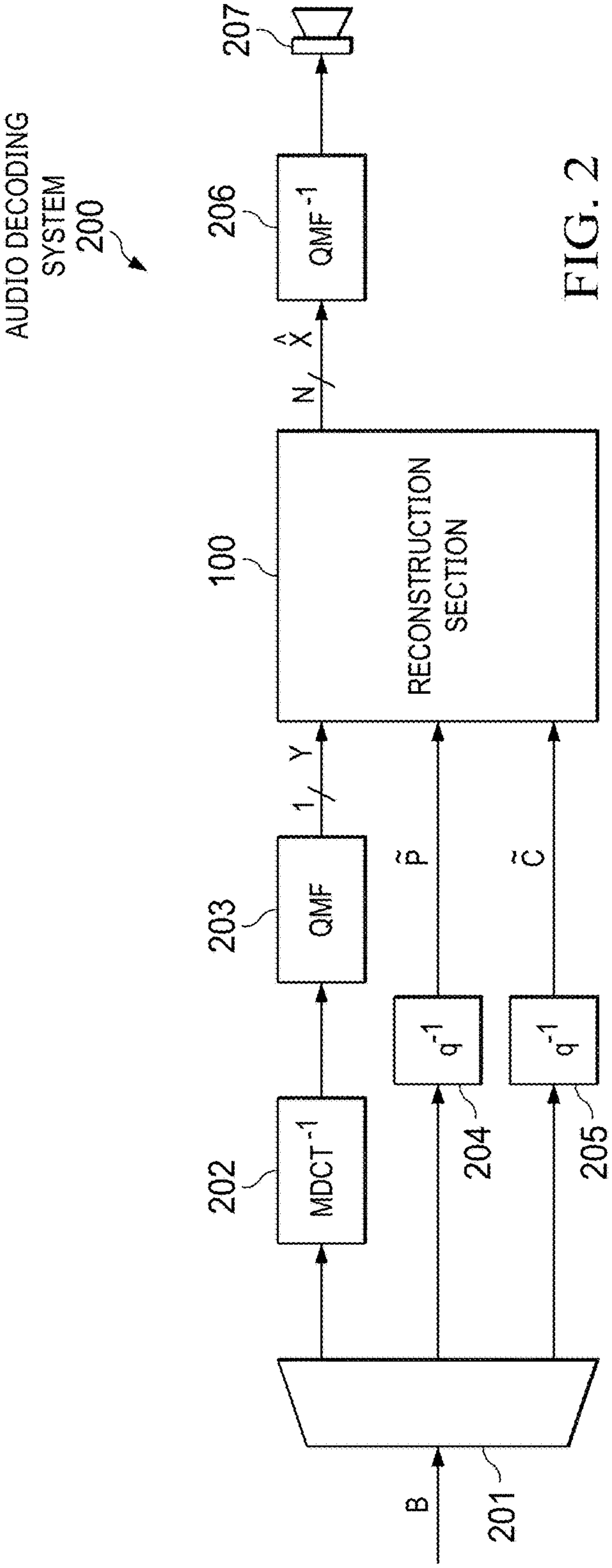
FIG. 2 is a generalized block diagram of an audio decoding system comprising the parametric reconstruction section depicted in FIG. 1, according to an example embodiment.

FIG. 2 is a generalized block diagram of an audio decoding system 200 according to an example embodiment. The audio decoding system 200 comprises the parametric reconstruction section 100 described with reference to FIG. 1. A receiving section 201, e.g. including a demultiplexer, receives the bitstream B transmitted from the audio encoding system 400 described with reference to FIG. 4, and extracts the downmix signal Y and the associated dry upmix parameters $\tilde{C}$ and wet upmix parameters $\tilde{P}$ from the bitstream B. In case the downmix signal Y is encoded in the bitstream B using a perceptual audio codec such as Dolby Digital or MPEG AAC, the audio decoding system 200 may comprise a core decoder (not shown in FIG. 2) configured to decode the downmix signal Y when extracted from the bitstream B. A transform section 202 transforms the downmix signal Y by performing inverse MDCT and a QMF analysis section 203 transforms the downmix signal Y into a QMF domain for processing by the parametric reconstruction section 100 of the downmix signal Y in the form of time/frequency tiles. Dequantization sections 204 and 205 dequantize the dry upmix parameters $\tilde{C}$ and wet upmix parameters $\tilde{P}$, e.g., from an entropy coded format, before supplying them to the parametric reconstruction section 100. As described with reference to FIG. 4, quantization may have been performed with one of two different step sizes, e.g. 0.1 or 0.2. The actual step size employed may be predefined, or may be signaled to the audio decoding system 200 from the encoder side, e.g. via the bitstream B. In some example embodiments, the dry upmix coefficients C and the wet upmix coefficients P may be derived from the dry upmix parameters $\tilde{C}$ and wet upmix parameters $\tilde{P}$, respectively, already in the respective dequantization sections 204 and 205, which may optionally be regarded as part of the dry upmix section 102 and the wet upmix section 103, respectively. In the present example embodiment, the reconstructed audio signal $\hat{X}$ output by the parametric reconstruction section 100 is transformed back from the QMF domain by a QMF synthesis section 206 before being provided as output of the audio decoding system 200 for playback on a multispeaker system 207.

FIGS. 5-11 illustrate alternative ways to represent an 11.1 channel audio signal by means of downmix channels, according to example embodiments. In the present example embodiments, the 11.1 channel audio signal comprises the channels: left (L), right (R), center (C), low-frequency effects (LFE), left side (LS), right side (RS), left back (LB), right back (RB), top front left (TFL), top front right (TFR), top back left (TBL) and top back right (TBR), which are indicated in FIGS. 5-11 by uppercase letters. The alternative ways to represent the 11.1 channel audio signal correspond to alternative partitions of the channels into sets of channels, each set being represented by a single downmix signal, and optionally by associated wet and dry upmix parameters. Encoding of each of the sets of channels into its respective single-channel downmix signal (and metadata) may be performed independently and in parallel. Similarly, reconstruction of the respective sets of channels from their respective single-channel downmix signals may be performed independently and in parallel.

It is to be understood that, in the example embodiments described with reference to FIGS. 5-11 (and also below with reference to FIGS. 13-16), none of the reconstructed channels may comprise contributions from more than one downmix channel and any decorrelated signals derived from that single downmix signal, i.e. contributions from multiple downmix channels are not combined/mixed during parametric reconstruction.

Figure 5:
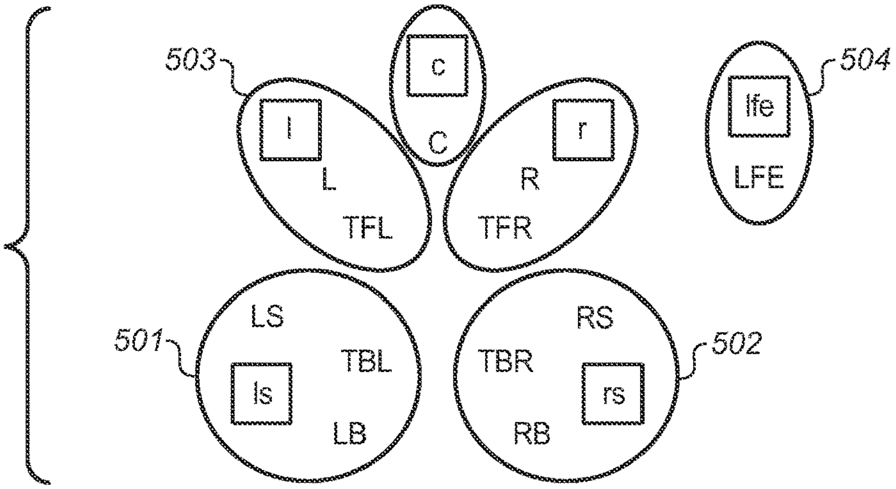
FIGS. 5-11 illustrate alternative ways to represent an 11.1 channel audio signal by means of downmix channels, according to example embodiments.
Figure 6:
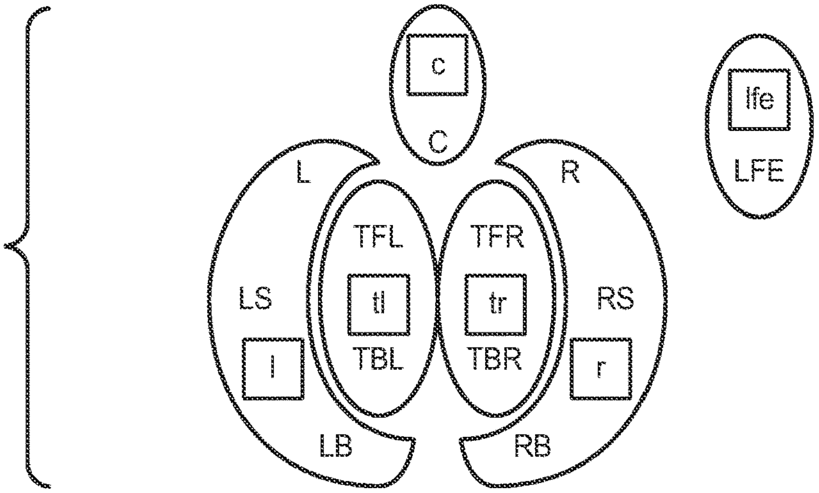
Figure 7:
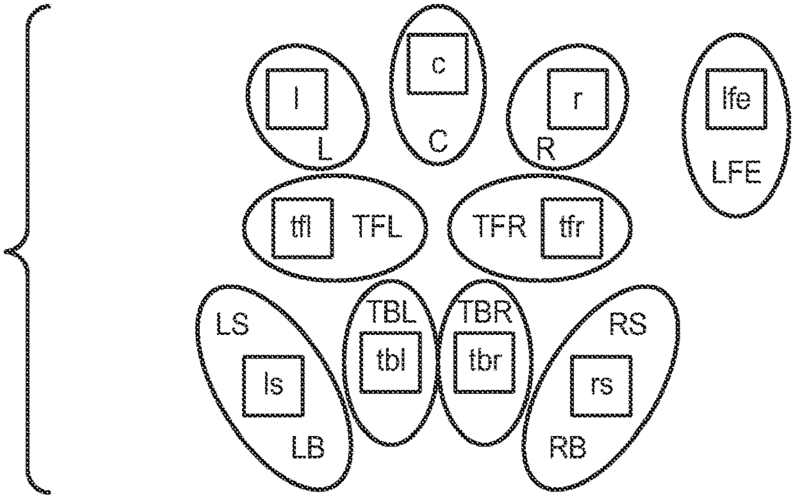
Figure 8:
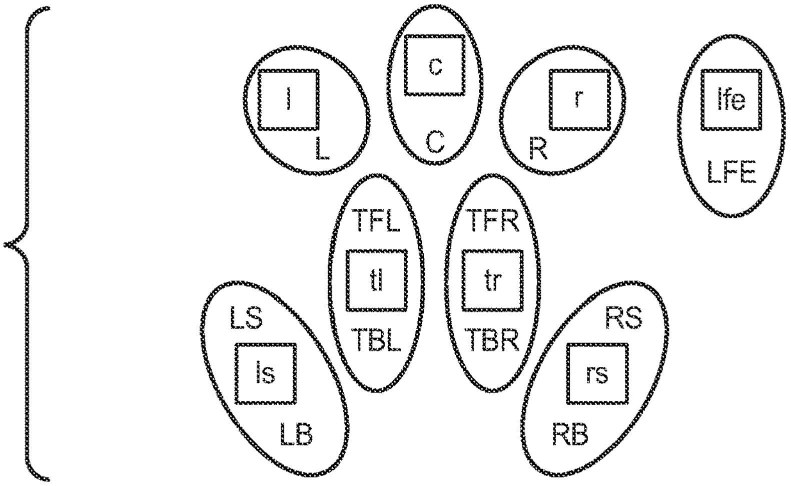
Figure 9:
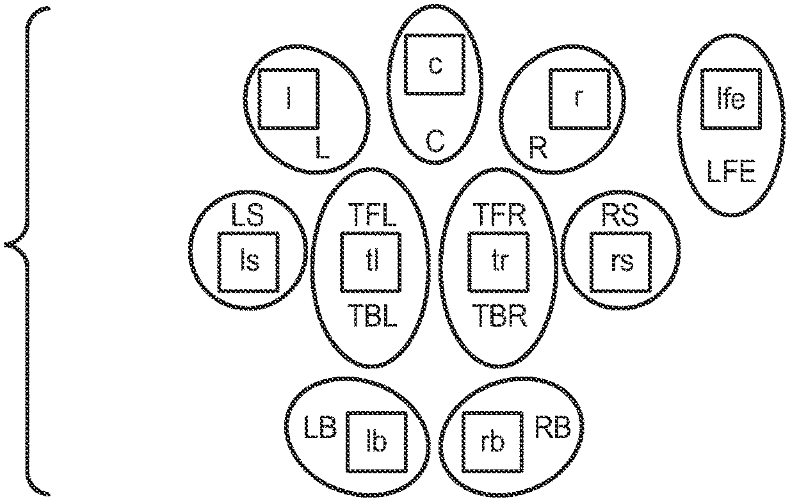
Figure 10:
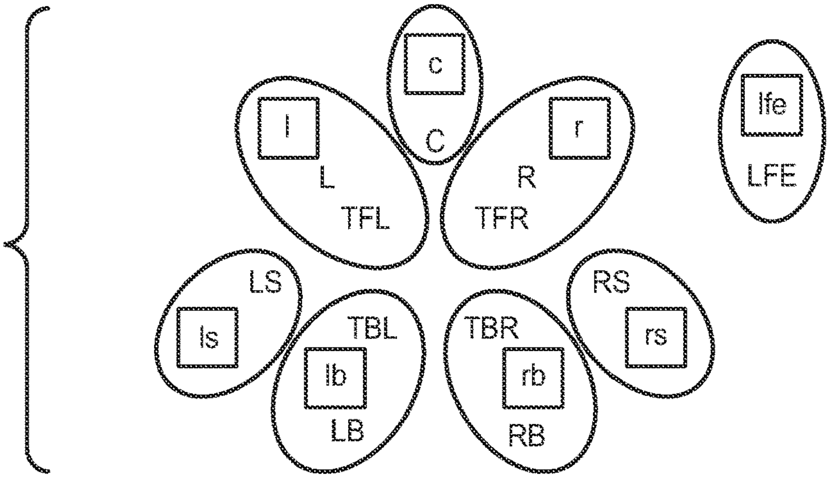
Figure 11:
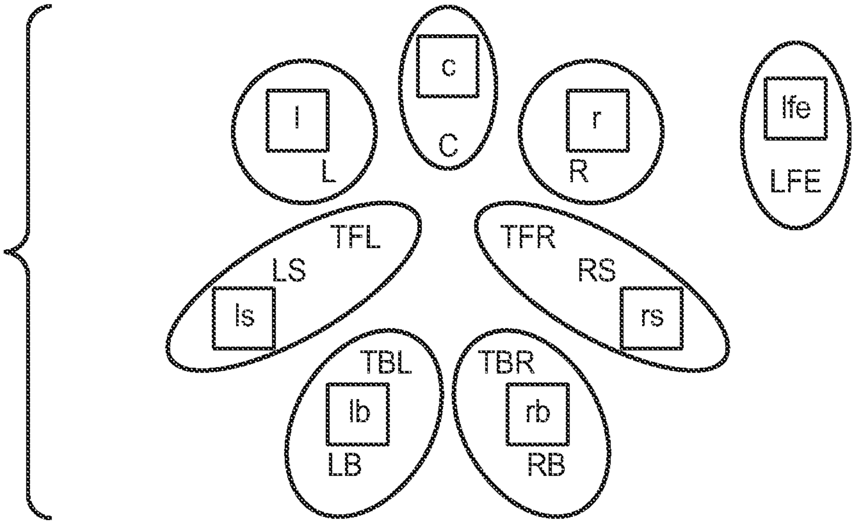

In FIG. 5, the channels LS, TBL and LB form a group 501 of channels represented by the single downmix channel ls (and its associated metadata). The parametric encoding section 300 described with reference to FIG. 3 may be employed with N=3 to represent the three audio channels LS, TBL and LB by the single downmix channel ls and associated dry and wet upmix parameters. Given that a predefined matrix V and predefined matrix class of an intermediate matrix $H_R$, both associated with the encoding performed in the parametric encoding section 300, are known on a decoder side, the parametric reconstruction section 100, described with reference to FIG. 1, may be employed to reconstruct the three channels LS, TBL and LB from the downmix signal ls and the associated dry and wet upmix parameters. Similarly, the channels RS, TBR and RB form a group 502 of channels represented by the single downmix channel rs, and another instance of the parametric encoding section 300 may be employed in parallel with the first encoding section to represent the three channels RS, TBR and RB by the single downmix channel rs and associated dry and wet upmix parameters. Moreover, given that a predefined matrix V and a predefined matrix class to which an intermediate matrix $H_R$ belongs, both associated with the second instance of the parametric encoding section 300, are known at a decoder side, another instance of the parametric reconstruction section 100 may be employed in parallel with the first parametric reconstruction section to reconstruct the three channels RS, TBR and RB from the downmix signal rs and the associated dry and wet upmix parameters. Another group 503 of channels includes only two channels L and TFL represented by a downmix channel 1. Encoding of these two channels into the downmix channel 1 and associated wet and dry upmix parameters may be performed by encoding sections and reconstruction section analogous to those described with reference to FIGS. 3 and 1, respectively, but for N=2. Another group 504 of channels comprises only a single channel LFE represented by a downmix channel lfe.

In this case, no downmixing is required and the downmix channel lfe may be the channel LFE itself, optionally transformed into an MDCT domain and/or encoded using a perceptual audio codec.

The total number of downmix channels employed in FIGS. 5-11 to represent the 11.1 channel audio signal varies. For example, the example illustrated in FIG. 5 employs 6 downmix channels while the example in FIG. 7 employs 10 downmix channels. Different downmix configurations may be suitable for different situations, e.g. depending on available bandwidth for transmission of the downmix signals and associated upmix parameter, and/or requirements on how faithful the reconstruction of the 11.1 channel audio signal should be.

According to example embodiments, the audio encoding system 400 described with reference to FIG. 4 may comprise a plurality of parametric encoding sections, including the parametric encoding section 300 described with reference to FIG. 3. The audio encoding system 400 may comprise a control section (not shown in FIG. 4) configured to determine/select a coding format for the 11.1-channel audio signal, from a collection for coding formats corresponding to the respective partitions of the 11.1 channel audio signal illustrated in FIGS. 5-11. The coding format further corresponds to a set of predefined rules (at least some of which may coincide) for computing the respective downmix channels, a set of predefined matrix classes (at least some of which may coincide) for intermediate matrices $H_R$ and a set of predefined matrices V (at least some of which may coincide) for obtaining wet upmix coefficients associated with at least some of the respective sets of channels based on respective associated wet upmix parameters. According to the present example embodiments, the audio encoding system is configured to encode the 11.1 channel audio signal using a subset of the plurality of encoding sections appropriate to the determined coding format. If, for example, the determined coding format corresponds to the partition of the 11.1 channels illustrated in FIG. 1, the encoding system may employ 2 encoding sections configured for representing respective sets of 3 channels by respective single downmix channels, 2 encoding sections configured for representing respective sets of 2 channels by respective single downmix channels, and 2 encoding sections configured for representing respective single channel as respective single downmix channels. All the downmix signals and the associated wet and dry upmix parameters may be encoded in the same bitstream B, for transmittal to a decoder side. It is to be noted that the compact format of the metadata accompanying the downmix channels, i.e. the wet upmix parameters and the wet upmix parameters, may be employed by some of the encoding sections, while in at least some example embodiments, other metadata formats may be employed. For example, some of the encoding sections may output the full number of the wet and dry upmix coefficients instead of the wet and dry upmix parameters. Embodiments are also envisaged in which some channels are encoded for reconstruction employing fewer than N−1 decorrelated channels (or even no decorrelation at all), and where metadata for parametric reconstruction may therefore take a different form.

According to example embodiments, the audio decoding system 200 described with reference to FIG. 2 may comprise a corresponding plurality of reconstruction sections, including the parametric reconstruction section 100 described with reference to FIG. 1, for reconstructing the respective sets of channels of the 11.1 channel audio signal represented by the respective downmix signals. The audio decoding system 200 may comprise a control section (not shown in FIG. 2) configured to receive signaling from the encoder side indicating the determined coding format, and the audio decoding system 200 may employ an appropriate subset of the plurality of reconstruction sections for reconstructing the 11.1 channel audio signal from the received downmix signals and associated dry and wet upmix parameters.

Figure 12:
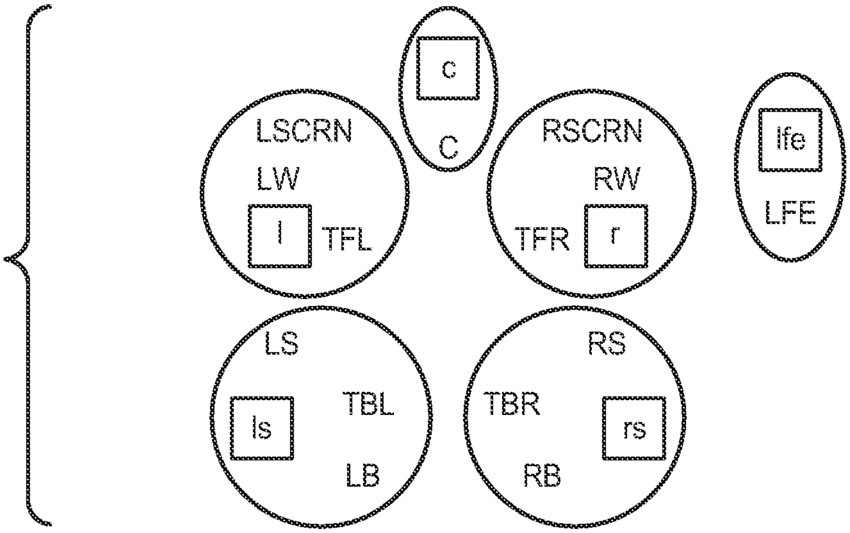
FIGS. 12-13 illustrate alternative ways to represent a 13.1 channel audio signal by means of downmix channels, according to example embodiments.
Figure 13:
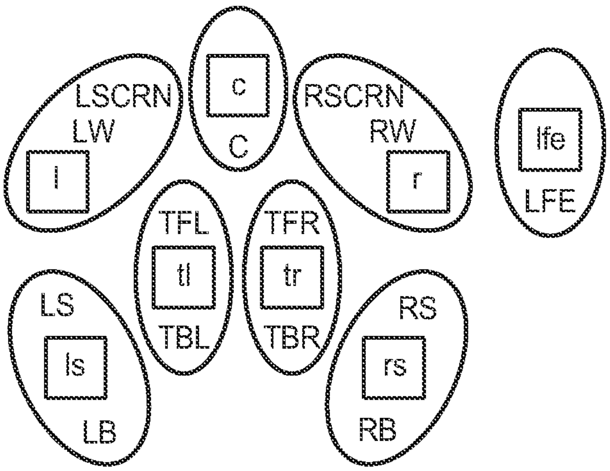

FIGS. 12-13 illustrate alternative ways to represent a 13.1 channel audio signal by means of downmix channels, according to example embodiments. The 13.1 channel audio signal includes the channels: left screen (LSCRN), left wide (LW), right screen (RSCRN), right wide (RW), center (C), low-frequency effects (LFE), left side (LS), right side (RS), left back (LB), right back (RB), top front left (TFL), top front right (TFR), top back left (TBL) and top back right (TBR). Encoding of the respective groups of channels as the respective downmix channels may be performed by respective encoding sections operating independently in parallel, as described above with reference to FIGS. 5-11. Similarly, reconstruction of the respective groups of channels based on the respective downmix channels and associated upmix parameters may be performed by respective reconstruction sections operating independently in parallel.

Figure 14:
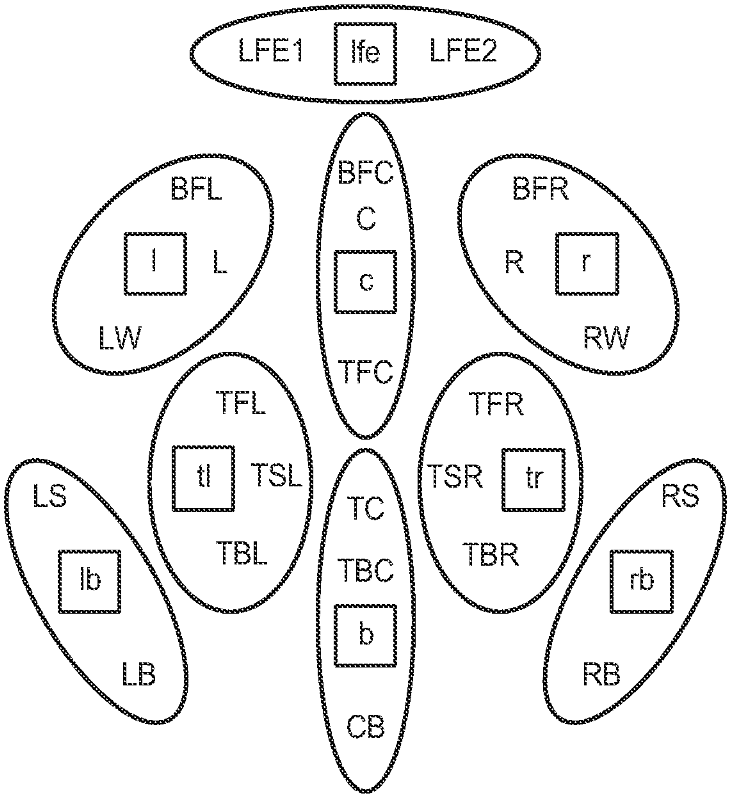
FIGS. 14-16 illustrate alternative ways to represent a 22.2 channel audio signal by means of downmix signals, according to example embodiments.
Figure 15:
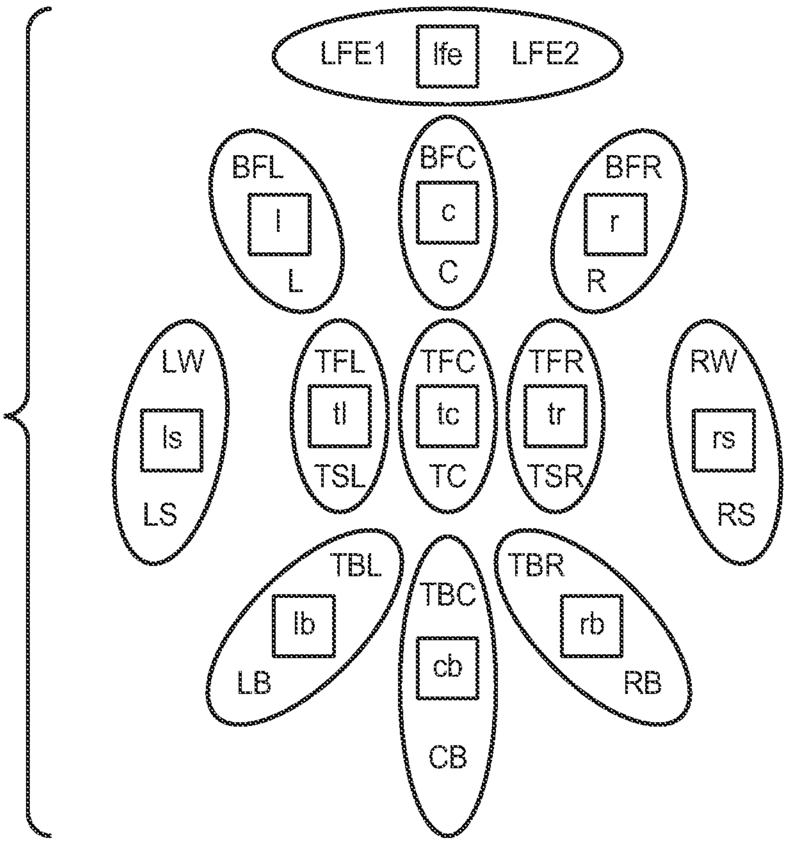
Figure 16:
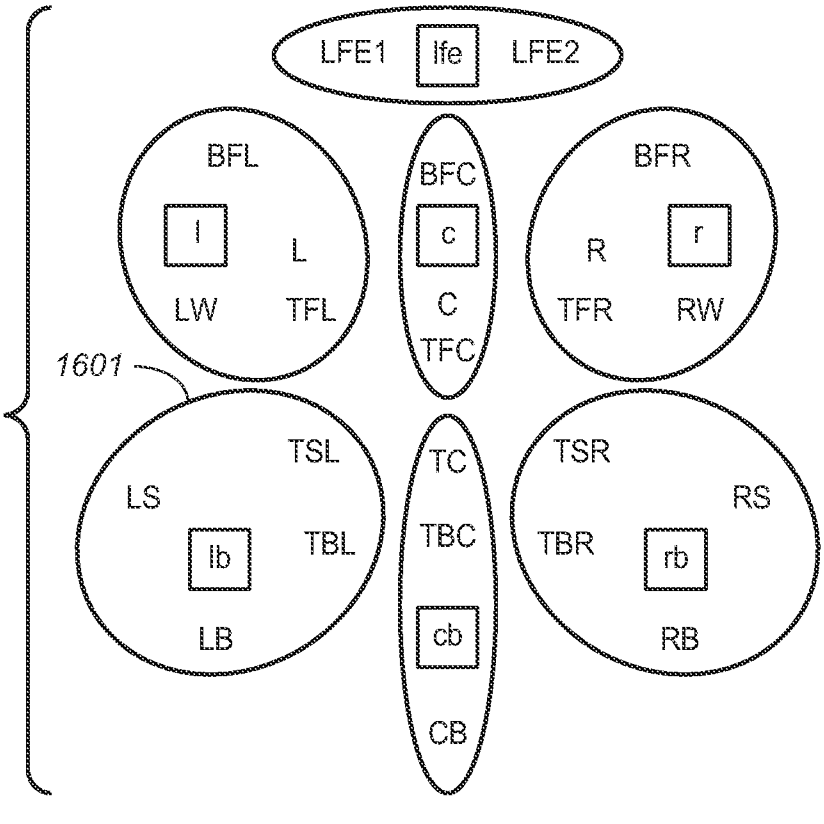

FIGS. 14-16 illustrate alternative ways to represent a 22.2 channel audio signal by means of downmix signals, according to example embodiments. The 22.2 channel audio signal includes the channels: low-frequency effects 1 (LFE1), low-frequency effects 2 (LFE2), bottom front center (BFC), center (C), top front center (TFC), left wide (LW), bottom front left (BFL), left (L), top front left (TFL), top side left (TSL), top back left (TBL), left side (LS), left back (LB), top center (TC), top back center (TBC), center back (CB), bottom front right (BFR), right (R), right wide (RW), top front right (TFR), top side right (TSR), top back right (TBR), right side (RS), and right back (RB). The partition of the 22.2 channel audio signal illustrated in FIG. 16 includes a group 1601 of channels including four channels. The parametric encoding section 300 described with reference to FIG. 3, but implemented with N=4, may be employed to encode these channels as a downmix signal and associated wet and dry upmix parameters. Analogously, the parametric reconstruction section 100 described with reference to FIG. 1, but implemented with N=4, may be employed to reconstruct these channels from the downmix signal and associated wet and dry upmix parameters.

III. Equivalents, Extensions, Alternatives and Miscellaneous

Further embodiments of the present disclosure will become apparent to a person skilled in the art after studying the description above. Even though the present description and drawings disclose embodiments and examples, the disclosure is not restricted to these specific examples. Numerous modifications and variations can be made without departing from the scope of the present disclosure, which is defined by the accompanying claims. Any reference signs appearing in the claims are not to be understood as limiting their scope.

Additionally, variations to the disclosed embodiments can be understood and effected by the skilled person in practicing the disclosure, from a study of the drawings, the disclosure, and the appended claims. In the claims, the word “comprising” does not exclude other elements or steps, and the indefinite article “a” or “an” does not exclude a plurality. The mere fact that certain measures are recited in mutually different dependent claims does not indicate that a combination of these measures cannot be used to advantage.

The devices and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A method of reconstructing an/V-channel audio signal (X) based on a single-channel downmix signal (Y), the method comprising:

- receiving, by a decorrelating section of a parametric reconstruction system, the single-channel downmix signal (Y);
- processing the single-channel downmix signal (Y) to output an (N−1)-channel decorrelated signal (Z), the processing including applying respective filters to the single-channel downmix signal (Y);
- receiving, by a dry upmix section of the parametric reconstruction system, the single-channel downmix signal (Y) and dry upmix parameters ($\tilde{C}$), the dry upmix parameters ($\tilde{C}$) coinciding with a first portion of a set of dry upmix coefficients (C);
- determining a remaining dry upmix coefficient of the set of dry upmix coefficients (C) based on a predefined relation between the set of dry upmix coefficients (C);
- outputting, by the dry upmix section, a dry upmix signal (CY) computed by mapping the single-channel downmix signal (Y) linearly in accordance with the set of dry upmix coefficients (C);
- receiving, by a wet upmix section of the parametric reconstruction system, the (N−1)-channel decorrelated signal (Z) and a set of wet upmix parameters ($\tilde{P}$);
- deriving, from the set of wet upmix parameters ($\tilde{P}$), a set of wet upmix coefficients (P);
- outputting, by the wet upmix section, a wet upmix signal (PZ) computed by mapping the (N−1)-channel decorrelated signal (Z) in accordance with the set of wet upmix coefficients (P); and
- combining, by a combining section of the parametric reconstruction system, the dry upmix signal (CY) and the wet upmix signal (PZ) to obtain a multidimensional reconstructed signal ($\hat{X}$) corresponding to the N-channel audio signal (X) to be reconstructed,
- wherein the dry upmix parameters ($\tilde{C}$) are extracted from a bitstream, and wherein the parametric reconstruction system includes one or more processors.

2. The method of claim 1, comprising:

- populating an intermediate matrix having more elements than the number of received wet upmix parameters, based on the received wet upmix parameters, the intermediate matrix belonging to a predefined matrix class.

3. The method of claim 2, wherein deriving the set of wet upmix coefficients comprises multiplying the intermediate matrix by a predefined matrix, wherein the set of wet upmix coefficients corresponds to a matrix resulting from the multiplication and includes more coefficients than the number of elements in the intermediate matrix.

4. The method of claim 3, wherein the predefined matrix class is one of:

- a first class of lower or upper triangular matrices, wherein known properties of all matrices in the first class include predefined matrix elements being zero;
- a second class of symmetric matrices, wherein known properties of all matrices in the second class include predefined matrix elements being equal; or
- a third class of products of an orthogonal matrix and a diagonal matrix, wherein known properties of all matrices in the third class include known relations between predefined matrix elements.

5. The method of claim 3, wherein the wet upmix parameters include N(N−1)/2 wet upmix parameters, wherein populating the intermediate matrix includes obtaining values for $(N-1)^2$ matrix elements based on the N (N−1)/2 wet upmix parameters and knowing that the intermediate matrix belongs to the predefined matrix class, wherein the predefined matrix includes N(N−1) elements, and wherein the set of wet upmix coefficients includes N(N−1) coefficients.

6. The method of claim 2, wherein populating the intermediate matrix includes employing the received wet upmix parameters as elements in the intermediate matrix.

7. An audio decoding system comprising:

- one or more processors; and
- a non-transitory computer-readable medium storing instructions that, upon execution by the one or more processors, cause the one or more processors to perform operations of reconstructing an N-channel audio signal (X) based on a single-channel downmix signal (Y), the operations comprising:
  - receiving, by a decorrelating section of a parametric reconstruction system, the single-channel downmix signal (Y);
  - processing the single-channel downmix signal (Y) to output an (N−1)-channel decorrelated signal (Z), the processing including applying respective filters to the single-channel downmix signal (Y);
  - receiving, by a dry upmix section of the parametric reconstruction system, the single-channel downmix signal (Y) and dry upmix parameters ($\tilde{C}$), the dry upmix parameters ($\tilde{C}$) coinciding with a first portion of a set of dry upmix coefficients (C);
  - determining a remaining dry upmix coefficient of the set of dry upmix coefficients (C) based on a predefined relation between the set of dry upmix coefficients (C);
  - outputting, by the dry upmix section, a dry upmix signal (CY) computed by mapping the single-channel downmix signal (Y) linearly in accordance with the set of dry upmix coefficients (C);

receiving, by a wet upmix section of the parametric reconstruction system, the (N−1)-channel decorrelated signal (Z) and a set of wet upmix parameters ($\tilde{P}$);

deriving, from the set of wet upmix parameters ($\tilde{P}$), a set of wet upmix coefficients (P);

outputting, by the wet upmix section, a wet upmix signal (PZ) computed by mapping the (N−1)-channel decorrelated signal (Z) in accordance with the set of wet upmix coefficients (F); and combining, by a combining section of the parametric reconstruction system, the dry upmix signal (CY) and the wet upmix signal (PZ) to obtain a multidimensional reconstructed signal ($\tilde{X}$) corresponding to the N-channel audio signal (X) to be reconstructed, wherein the dry upmix parameters ($\tilde{C}$) are extracted from a bitstream.

8. The system of claim 7, wherein the operations comprise:

populating an intermediate matrix having more elements than the number of received wet upmix parameters, based on the received wet upmix parameters, the intermediate matrix belonging to a predefined matrix class.

9. The system of claim 8, wherein deriving the set of wet upmix coefficients comprises multiplying the intermediate matrix by a predefined matrix, wherein the set of wet upmix coefficients corresponds to a matrix resulting from the multiplication and includes more coefficients than the number of elements in the intermediate matrix.

10. The system of claim 9, wherein the predefined matrix class is one of:

a first class of lower or upper triangular matrices, wherein known properties of all matrices in the first class include predefined matrix elements being zero;

a second class of symmetric matrices, wherein known properties of all matrices in the second class include predefined matrix elements being equal; or a third class of products of an orthogonal matrix and a diagonal matrix, wherein known properties of all matrices in the third class include known relations between predefined matrix elements.

11. The system of claim 9, wherein the wet upmix parameters include N(N−1)/2 wet upmix parameters, wherein populating the intermediate matrix includes obtaining values for $(N-1)^2$ matrix elements based on the N(N−1)/2 wet upmix parameters and knowing that the intermediate matrix belongs to the predefined matrix class, wherein the predefined matrix includes N(N−1) elements, and wherein the set of wet upmix coefficients includes N(N−1) coefficients.

12. The system of claim 8, wherein populating the intermediate matrix includes employing the received wet upmix parameters as elements in the intermediate matrix.

13. A non-transitory computer-readable medium storing instructions that, when executed by one or more processors, cause the one or more processors to perform operations of reconstructing an N-channel audio signal (X) based on a single-channel downmix signal (Y), the operations comprising:

receiving, by a decorrelating section of a parametric reconstruction system, the single-channel downmix signal (Y);

processing the single-channel downmix signal (Y) to output an (N1)-channel decorrelated signal (Z), the processing including applying respective filters to the single-channel downmix signal (Y);

receiving, by a dry upmix section of the parametric reconstruction system, the single-channel downmix signal (Y) and dry upmix parameters ($\tilde{C}$), the dry upmix parameters ($\tilde{C}$) coinciding with a first portion of a set of dry upmix coefficients (C);

determining a remaining dry upmix coefficient of the set of dry upmix coefficients (C) based on a predefined relation between the set of dry upmix coefficients (C);

outputting, by the dry upmix section, a dry upmix signal (CY) computed by mapping the single-channel downmix signal (Y) linearly in accordance with the set of dry upmix coefficients (C);

receiving, by a wet upmix section of the parametric reconstruction system, the (N−1)-channel decorrelated signal (Z) and a set of wet upmix parameters ($\tilde{P}$);

deriving, from the set of wet upmix parameters ($\tilde{P}$), a set of wet upmix coefficients (P);

outputting, by the wet upmix section, a wet upmix signal (PZ) computed by mapping the (N−1)-channel decorrelated signal (Z) in accordance with the set of wet upmix coefficients (P); and combining, by a combining section of the parametric reconstruction system, the dry upmix signal (CY) and the wet upmix signal (PZ) to obtain a multidimensional reconstructed signal ($\hat{X}$) corresponding to the N-channel audio signal (X) to be reconstructed, wherein the dry upmix parameters ($\tilde{C}$) are extracted from a bitstream.

* * * * *